Dec. 17, 1963     R. L. BUSTAMANTE     3,114,509
ILLUMINATING MEANS
Filed July 25, 1955

INVENTOR
ROBERTO L. BUSTAMANTE
BY Cushman, Darby & Cushman
ATTORNEYS

United States Patent Office 3,114,509
Patented Dec. 17, 1963

3,114,509
ILLUMINATING MEANS
Roberto L. Bustamante, 4a Calle Poniente 40,
Santa Ana, El Salvador
Filed July 25, 1955, Ser. No. 524,129
3 Claims. (Cl. 240—8.22)

My invention relates to illuminating means and more particularly to a lamp assembly for use as a signal light on motor vehicles to indicate to other vehicles and pedestrians, the greatest width dimension of the vehicle, thereby providing means to prevent accidents which would otherwise occur. While I have shown and described the lamp assembly for employment as a side signal light, it is to be understood that it has other uses as will be readily apparent to persons skilled in the art.

It is well known that during night driving, vehicle headlights frequently blind the driver of a car approaching in the opposite direction with the result that the oncoming car either runs off the road or strikes the other vehicle at a point rearwardly of the headlights since such lights are located within the widest area of the car. This is particularly true of vehicles such as vans, trucks and trailers, and. while such vehicles have been provided with safety lights, these lights are either not disposed at the points of greatest width of the vehicle or are positioned at locations which are difficult to see. In the case of pedestrians, the same problems arise, and many persons are injured walking along unlighted highways or roads since they have no way of judging the point of greatest width of the oncoming car due to the blinding effect of the headlights.

Hence, one of the salient objects of this invention is to provide a lamp assembly which will overcome the foregoing and other objectionable features of the art by locating a signal lamp on each side of the vehicle at the point of greatest width of the vehicle at the normal line of vision of the oncoming vehicles or pedestrians.

Another object of the invention is to provide a signal lamp for the purposes indicated in which the lamp is so constructed that light rays are visible throughout an arc of at least 270 degrees whereby the lamp can be seen from great distances forwardly, rearwardly and laterally of the vehicle.

Yet another object of the invention is to provide a side signal lamp assembly for vehicles wherein two lights of different color are visible to focus the eyes of the driver of an oncoming vehicle at the point of greatest width of the vehicle and such arrangement of lights serving as means to denote in all countries that such lights indicate the point of greatest width of the vehicle equipped with the same.

Still a further object of the invention is to provide side signal lights for the motor vehicles which are located directly above the axle of the vehicle's rear wheel at the normal line of vision of oncoming traffic which will be clearly visible due to the dark zone of the vehicle rearwardly of the headlights so that the driver can avoid "crashing" into the rear wheel.

An additional object of the invention is to provide a lamp assembly of the character described wherein the lamp housing is provided with means enabling the rays to be directed either downward, forward or rearward so that the lamp may be employed as a trouble light for the repair of tires or other parts.

And yet a further object of the invention is to provide a lamp assembly for a vehicle wherein the rays may be directed in a downward direction to illuminate a limited area of the vehicle or the roadway so that persons leaving the car will not trip or step into water, et cetera.

Another object of the invention is to provide a lamp unit which when applied to a bus, van or the like may be employed to illuminate the name of the vehicle for identification purposes, as well as a parking light.

With the foregoing and other objects in view, the invention broadly comprises a housing for attachment to a vehicle or other support, the housing being provided with openings visible throughout an arc of at least 270 degrees, an annular contact plate mounted within the housing, an electrical conductor connected to the plate, at least one light bulb arranged within the housing for directing light rays through the opening, a metal annulus on the light bulb adapted to rest upon the contact plate and spring means associated with the housing and the annulus to urge the annulus into contact with the plate.

From a reading of the ensuing description, further objects and advantages of the invention will become more readily apparent to one skilled in the art.

For a further understanding of the invention, reference will be had to the accompanying drawings in which, the same reference characters denote the same or similar parts and in which, FIGURE 1 is a vertical sectional view of the basic lamp structure.

Figure 1:
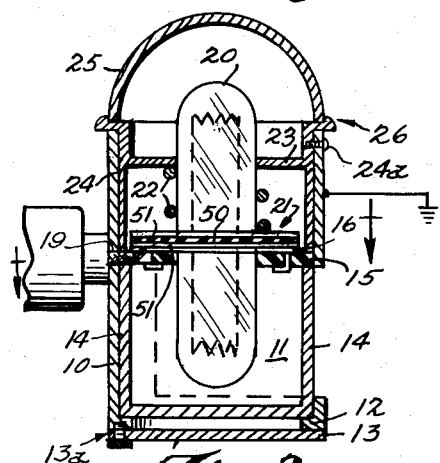
Figure 2:
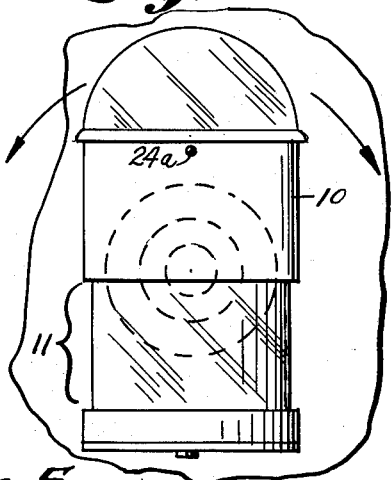
FIGURE 2 is an elevational view of the lamp shown in FIGURE 1.
Figure 3:
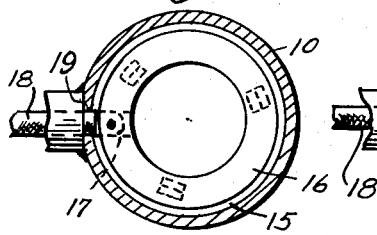
FIGURE 3 is a plan view of the contact ring.
Figure 5:
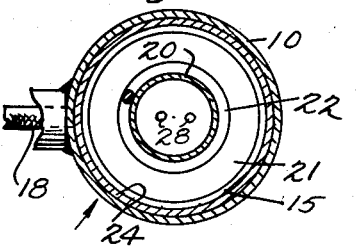
FIGURE 5 is a horizontal section taken through FIGURE 1.
Figure 4:
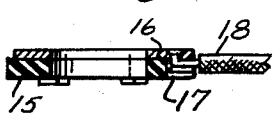
FIGURE 4 is a vertical section of the contact ring.
Figure 6:
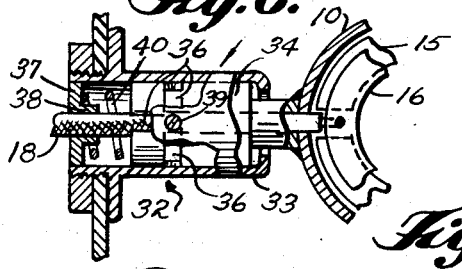
FIGURE 6 is detail view partly in cross section of the adjustable supporting bracket.

As illustrated, the present lamp comprises a housing 10 of a suitable metal or plastic and it will be noted that the housing is provided with a horizontally disposed window 11. The window 11 extends throughout an arc of at least 270 degrees so as to provide illumination throughout substantially the entire circumference of the housing. The housing is preferably open at each end thereof and the lower end may be provided with an inwardly extending ring 12 to which is pivoted a cover plate 13, as at 13a the function of which will be later more fully set forth. A glass cup 14, the outer diameter of which substantially coincides with the inner diameter of the housing is disposed within the housing and the closed end thereof rests upon the ring 12. A fiber washer or other insulating material 15 is positioned within the housing and the washer is supported by the upper open end of the cup 14. A contact ring 16 is formed with prongs which engage slots in the washer to anchor the ring to the washer, and the washer is formed with a radial slot 17 in which a conductor 18 is located, the conductor being suitably connected to the ring 16 and extending through an aperture 19 in the wall of the housing 10. Hence, it will be seen that the conductor 18 is located wtihin the height dimension of the slot 17 so the ring can rest flush on the upper planar surface of the washer and the lower surface of the washer can rest flat on the upper end of the cup.

A light bulb assembly 20 is provided with a horizontal flange or annulus 21, which when inserted into the housing rests upon the ring 16 to define a contact between the respective parts. To maintain the flange 21 in engagement with the ring 16, a coil spring 22 surrounds the bulb and one end bears against flange 23 of a metal cup 24 inserted into the housing with the open edge of the cup resting on the washer 15 while the other end of the spring bears against the annulus 21. Consequently, when the cup 24 is in place, the spring 22 will urge the annulus 21 into contact with the ring 16. A glass dome 25 closes the upper end of the housing and is held in place by a flange on the cup 24 which coacts with dome 25 as shown generally at 26. To secure cup 24 in place, the wall of the cup and the wall of housing 10 are provided with registering apertures and a screw 24a is shown lodged in such apertures.

The lower end of the cup 24 and the washer 15 will provide a seal between the respective parts.

With the parts assembled as described above, the housing may be attached to the side of a vehicle above the rear axle at the line of vision of oncoming traffic by either a stationary bracket or a bracket permitting the housing and its parts to be swung through an arc of 90 degrees in either direction from the vertical or a position perpendicular to the road being traversed. In the case of the stationary bracket, the bracket may be formed with the material left over in the fabrication of the window, which material may be bent outwardly to define two diametrically opposed wings which can be disposed in contact with the side of the vehicle and a screw or other attaching device can be passed through an opening in each wing to secure the housing to the vehicle side.

Figure 7:
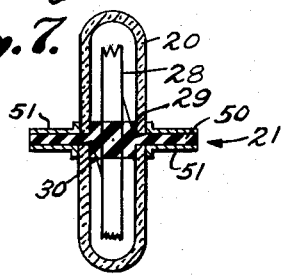
FIGURE 7 is a vertical section of a modified bulb.

The light bulb assembly is preferably of a miniature type and can be of either single or double bulb character. In the case of the double bulb type, lead wire 28 is bent as at 29 and is connected to the annulus 21, while the other wire is bent at 30 and is connected to the annulus. The annulus 21 may be of greater width within the envelope than on the outside thereof for strengthening purposes as shown in FIGURE 7. In situations where the double bulb type is used, the lower bulb will be located within the window opening, and the upper bulb within the dome. Hence, when the respective bulbs are lighted, a substantially uniform distribution of light rays will flow from the window and the dome, thereby making the lamp readily discernible to other vehicles and pedestrians.

Since the light bulb eliminates the use of screw threads, it will be seen that the envelope can be of greater dimensions so that the bulbs can provide a materially greater amount of light for the same overall dimensions which is an important factor.

With further reference to the cover plate 13, if such plate is swung about its pivot to the housing, the lower end of the housing is uncovered, and the rays of the bulb are directed in a downward direction to illuminate a limited area of the vehicle and the roadway.

In lieu of the dome, a cap may be used to cover the upper end of the housing, and, in such a situation, a single bulb is employed instead of the double bulb as shown in FIGURE 1.

It can be seen that the housing and its closure elements may be of various constructions so long as the housing is formed with at least one window of equal or varied dimensions and the bulb may be of either a single or double character. The primary factor is that the lamp in its entirety consumes but little space and thus can be installed on vehicles without detracting from the contour of the vehicle. Furthermore, in the event it is necessary to replace the bulb, this can be done by merely removing the upper closure. In addition, the flange of the metal cup serves as a guide for the bulb, making it easy to install the same.

As previously mentioned, it is possible to turn the housing through an arc of 90 degrees in either a clockwise or a counterclockwise direction and to achieve this end, a special mounting bracket 32 is used. This bracket includes an outer housing 33 which at one end is secured to the side wall of the vehicle in any convenient manner such as by screw threads. The housing 33 is hollow and a sleeve 34 is disposed within the housing. The sleeve has a reduced extension which extends through an opening in the end of the housing and is brazed or welded to the housing to serve as an axle for the housing. The sleeve is provided with a bayonet slot 36 which extends 90 degrees and an annular fitting 37 having an extension 38 is positioned in the sleeve, the housing being provided with a lug 39 adapted to cooperate with the bayonet slot 36. The fitting 37 closes the inner open end of the housing 33 and a coil spring 40 surrounds the extension, with one end bearing against the lower face of the fitting and the other end against a shoulder of the sleeve 34. To rotate the housing 10 either 90 degrees to the left or to the right, the housing is pushed inwardly, thus compressing the spring 40 and the lug 39 enters the later portions whereupon the sleeve may be turned in the direction desired and when released, the spring will hold the sleeve in the proper position in the selected lateral portion of the bayonet slot. Needless to say, the conductor 18 passes through the bore of the fitting, the extension, housing and the sleeve and the extension serves as a guide for the conductor and keeps the same out of contact with the spring. By thus mounting the housing 10, it will be appreciated that the light rays may be directed toward the front or the rear of the vehicle to function as a trouble lamp for changing flat tires or making any other desired repairs within the effective range of the lamp or lamps.

It is my main purpose to use a double ended bulb with the two bulbs being of different colors or the cup and dome being of the desired color. Preferably, the lower bulb is of a type to emanate pale or white light to provide adequate lighting for the purposes hereinabove mentioned. This arrangement will serve to focus the eyes of the oncoming vehicle drivers or pedestrians thereon, and, upon education or by traffic regulations, the public will associate two small lights of different colors with that area of the vehicle which is of the greatest width and thus know the clearance necessary to avoid an accident with the oncoming vehicle. In addition to this function, the light will serve as a parking light, a trouble light and a means of identifying the particular vehicle to which it is attached in the case of a housing having a transparent dome closing the upper end thereof. Furthermore, the lower bulb will illuminate a substantial area on both sides of the light. One of the most important features of the invention is the fact that the window 11 is of such dimensions that the light rays are visible throughout an arc of substantially 270 degrees so that the lights are visible from any point forward, rearward or laterally of the vehicle. Since the respective bulbs are separated, a single color is visible in the window and the dome which will give the effect of two distinct lights and this effect is readily discernible by the oncoming traffic, either vehicular or pedestrian.

Figure 8:
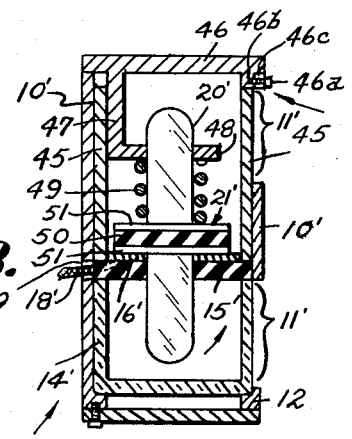
FIGURE 8 is a vertical sectional view of a modified lamp structure.

In the form shown in FIGURE 8, the housing 10' is provided with two vertically spaced windows 11' and the glass cup rests on the ring. The washer and contact ring are disposed upon the upper open end of the cup and the annulus 21' of the bulb 20' rests on the ring 16'. A glass sleeve 45 closes the upper window 11' with the lower end bearing on the upper surface of the washer 15' with the upper end terminating short of the upper end of the housing 10'. To maintain the annulus 21' in contact with the ring 16', closure cap 46 is provided with a vertical strip 47 having a ring 48 at the lower end thereof and one end of spring 49 may be secured to the ring 48. The cap 46 is secured to the housing 10' by lodging a screw 46a in registering apertures 46b and 46c in the wall of the cap and the upper ring of the housing 10'. The other end of the spring bears against the annulus 21' and with the cap in place, the spring will urge the annulus into contact with the ring.

With further reference to the annulus 21, it will be seen the same includes a central part 50 of insulating material and outer metal plates 51 to which the wires of the filaments are secured, the wires passing through the central part 50.

Obviously it will be appreciated that various types of closures can be used with the open ends of the housing and the window or windows can be of various types.

For example, the window may be of continuous type or it may be formed by a series of spaced apart openings of any desired configuration. Regardless of what type window is employed, light will be visible throughout an arc of not less than 270 degrees.

Due to the interchangeability of the salient parts, the light is quite flexible as to various uses, and, by virtue of its simplicity structurally, it can be manufactured at a reasonable cost.

The invention is not to be confined to any strict conformity with the showing in the drawings but may be changed or modified so long as such changes or modifications mark no material departure from the salient features of the invention as expressed in the appended claims.

Having thus illustrated and described the preferred forms of my invention, I hereby claim as novel, the following subject matter.

I claim:

1. A clearance light for motor vehicles and other uses, comprising a housing having at least two vertically spaced windows therein, the housing having upper and lower open ends, means serving to close the upper open end, seat means at the open lower end, a horizontally disposed insulated metal contact ring supported within the housing, the seat means serving to support the contact ring and including a transparent insulated cup having an outer diameter slightly less than the inner diameter of the housing with the insulated metal contact ring resting on the upper edge of the cup, a transparent sleeve within the housing above the contact ring and terminating short of the upper open end of the housing, the cup and the sleeve also serving to seal the inside of the housing against the entry of foreign matter, a conductor connected to the said ring and passing through an opening in the side of the housing for connection to a source of electrical energy, a bulb disposed within the housing above the ring and visible through one of said windows, a metal annulus on the bulb for direct engagement with a major part of the contact ring, spring means within the housing urging said ring and annulus together, and means for mounting the housing on the motor vehicle.

2. A clearance light as defined in claim 1 wherein the said spring means is carried by a ring mounted on the means closing the open upper end of the housing, with the other end of the spring means bearing against the metal annulus on the bulb for maintaining the annulus and the contact ring together.

3. A clearance light as defined in claim 1 wherein the said bulb is of double ended type with each bulb being visible through the respective windows and the metal annulus being located intermediate the bulbs.

References Cited in the file of this patent

UNITED STATES PATENTS

| | | |
|---|---|---|
| 564,036 | Thompson | July 14, 1896 |
| 1,082,079 | Goff | Dec. 23, 1913 |
| 1,416,467 | Hobbs | May 16, 1922 |
| 1,435,080 | Potter | Nov. 7, 1922 |
| 1,552,705 | Johnson | Sept. 8, 1925 |
| 1,595,047 | Monson | Aug. 3, 1926 |
| 1,707,473 | Goldberg | Apr. 2, 1929 |
| 1,770,738 | Handy | July 15, 1930 |
| 1,775,586 | Becker | Sept. 9, 1930 |
| 1,800,078 | Johnson | Apr. 7, 1931 |
| 2,171,089 | Hawkins | Aug. 29, 1939 |
| 2,219,940 | Ritz-Woller | Oct. 29, 1940 |

FOREIGN PATENTS

| | | |
|---|---|---|
| 533,556 | Germany | Sept. 16, 1931 |